Figure 1:
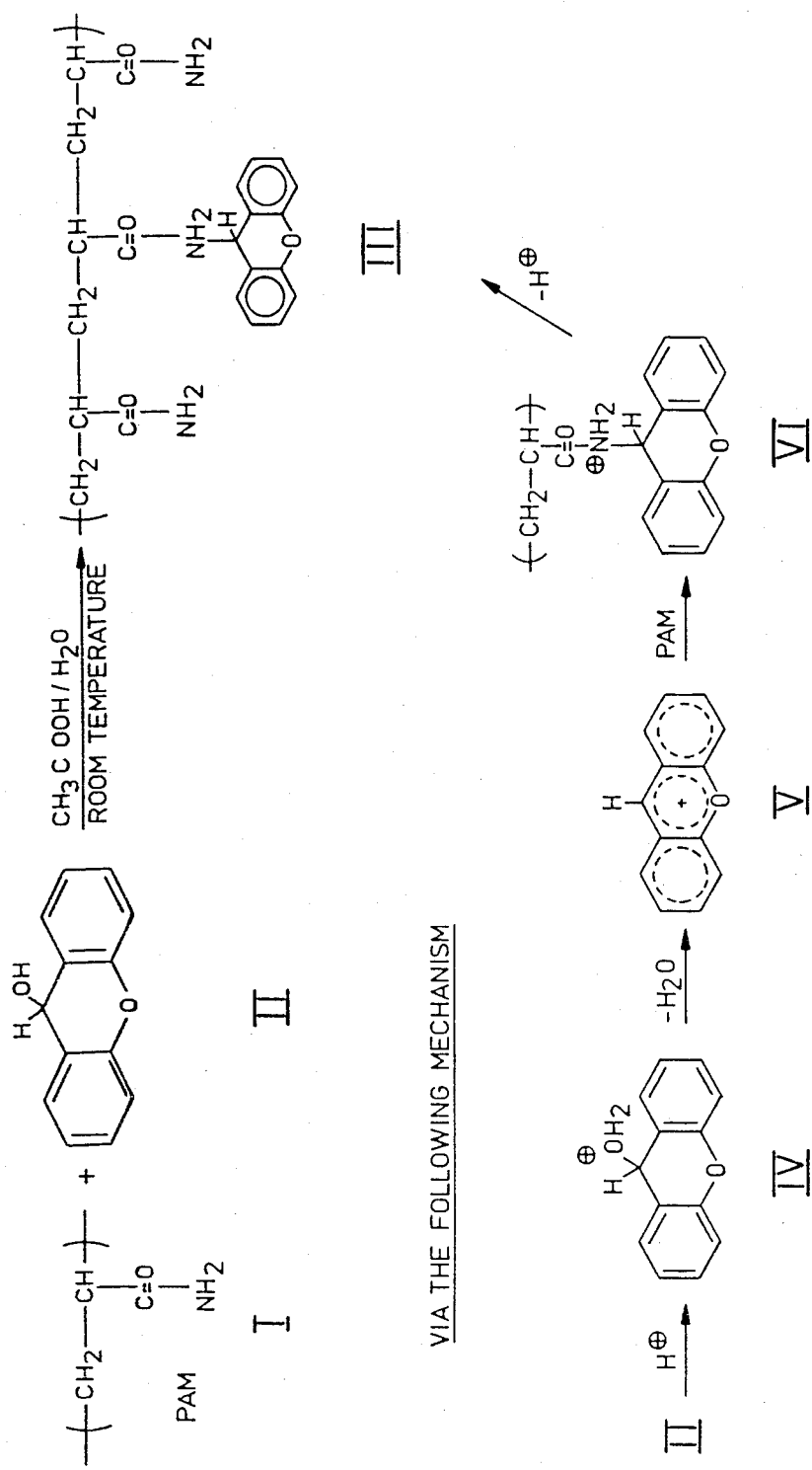

United States Patent [19]

Winnik et al.

[11] Patent Number: 4,813,973
[45] Date of Patent: Mar. 21, 1989

[54] MODIFIED, WATER-SOLUBLE POLYMERS CONTAINING AMIDE GROUPS REACTED WITH XANTHYDROL AND OTHER DYES

[75] Inventors: Mitchell A. Winnik; Robert M. Borg, both of Toronto, Canada

[73] Assignee: The University of Toronto Innovations Foundation, Toronto, Canada

[21] Appl. No.: 141,987

[22] Filed: Jan. 11, 1988

[51] Int. Cl.⁴ .............................................. C09B 69/10
[52] U.S. Cl. ........................................... 8/647; 8/400; 8/506; 8/516; 8/648; 8/654; 8/657
[58] Field of Search ...................... 8/647, 516

[56] References Cited

U.S. PATENT DOCUMENTS

| | | | |
|---|---|---|---|
| 3,743,622 | 7/1973 | Wagner et al. | 8/647 |
| 4,049,376 | 9/1977 | Le Pape | 8/647 |
| 4,166,105 | 8/1979 | Hirschfeld | 424/8 |
| 4,169,137 | 9/1979 | Hirschfeld et al. | 424/8 |
| 4,194,877 | 3/1980 | Peterson | 8/647 |
| 4,314,808 | 2/1982 | Jacquet et al. | 8/405 |
| 4,382,800 | 5/1983 | Wang et al. | 8/404 |
| 4,434,150 | 2/1984 | Azad et al. | 424/1.1 |

Primary Examiner—A. Lionel Clingman
Attorney, Agent, or Firm—Wyatt, Gerber, Burke and Badie

[57] ABSTRACT

Water-soluble, amide group containing polymers such as polyacrylamide are modified, to render them easy to detect, by reacting the polymer in aqueous solution with organic dye molecules which can form stable carbo-cations reversibly in water. The labelled polymers can then be detected spectrophotometrically. An example of a suitable dye molecule is 9-xanthydrol.

29 Claims, 1 Drawing Sheet

VIA THE FOLLOWING MECHANISM

MODIFIED, WATER-SOLUBLE POLYMERS CONTAINING AMIDE GROUPS REACTED WITH XANTHYDROL AND OTHER DYES

This invention relates to modified, water-soluble polymers containing amide groups.

Water-soluble polymers containing amide groups such as polyacrylamide of high molecular weight and its derivatives containing anionic groups (eg. sulphate, sulphonate, carboxylate), cationic groups (eg. ammonium, alkylammonium) or hydrophobic groups are used in many processes. For example, they are used in drilling muds for oil wells, as pusher fluids in enhanced oil recovery, as flocculents in pulp and paper manufacture and as flocculents in waste water treatment of waste water from, for example, pulp and paper industries and oil industries. Additional examples of uses of these polymers are given in "Handbook of Water-Soluble Gums and Resins": Robert L. Davidson, McGraw-Hill Book Co., 1980, Chapter 16.

One problem associated with using these polymers is that of detecting their location and/or concentration. When the polymers are used as pusher fluids, it is difficult to determine where the polymer comes out after it is injected into the ground. It is desirable to locate where the polymer comes out to optimize enhanced oil recovery. Also, for environmental reasons, the presence of and the concentration of these polymers in waste water needs to be determined.

Conventional chemical analysis for polyacrylamide is neither very sensitive nor very specific. Current methods require an involved chemical hydrolysis of the polymer followed by a measurement of the amount of amine liberated.

It has been previously attempted to label polymers with dye molecules to enhance detection thereof. Most of these attempts involve co-polymerization, where a dye molecule (on its own, or incorporated into a reactive monomer unit) is allowed to participate in the bulk polymerization of the pure monomer, or mixtures of monomers. Thus, for example, U.S. Pat. No. 4,194,877 describes the polymerization of acrylic monomers such as acrylamide or methyl methacrylate in the presence of such dyes as phenol red or brilliant yellow C.I. No. 14890 resulting in the formation of dye-incorporated water soluble polyacrylamide and polymethylmethacrylate. In related approaches, Nishijima and coworkers (Y. Nishijima, A. Teramoto, M. Yamamoto, and S. Hiratsuka. *J. Poly. Sci.,* Part A-2, 5, 23–35 (1967)) carried out the polymerization of acrylamide in the presence of sodium fluoroscein and obtained a polymer which they claimed to be labelled at the ends of the chain, while both Thomas (D. Y. Chu and J. K. Thomas. *Macromolecules,* 17, 2142-47, (1984)) and Turro (N. J. Turro and K. S. Arora. *Polymer,* 27, 783, (1986)) have described the co-polymerization of acrylic acid with a pyrene-labelled monomer unit.

It has also been previously attempted to modify polymers to contain dye groups. Ricka et al (J. Ricka, H. Gysel, J. Schneider, R. Nyffenegger, and T. Binkert. *Macromolecules,* 20, 1407-11 (1987)) have described the fluorescein labelling of polyacrylamide by means of modification of the polymer. Thus, they carried out a partial transformation of the amide groups to amine moieties by means of a Hoffman amide degradation. Then, using techniques well known to protein chemists, they covalently attached the reactive dye fluorescein isothiocyanate to the amino groups. A modification approach was utilized by Inman and Dintzis (J. K. Inman and H. M. Dintzis. *Biochemistry,* 8, 4074–82 (1969)) for the labelling of cross-linked polyacrylamide beads with dye molecules. The amide sites were modified by means of amidoethylation, addition of hydrazine, or hydrolysis, followed by reaction with reactive dyes. Further derivatization often preceded the incorporation of dye molecules. This approach requires two or more steps and the conditions used frequently favour concurrent amide hydrolysis. Furthermore, the Hoffman degradation is accompanied by chain scission which lowers the molecular weight of the polymer. This is especially a problem in the amidoethylation reaction, for which a temperature of 90° C. is required.

It is an object of the present invention to obviate or mitigate the above-mentioned disadvantages. It is also an object of the present invention to modify polymers containing amide groups to render them relatively easy to detect.

Accordingly, the invention provides a process of preparing modified water-soluble polymer containing amide groups. The process comprises reacting organic dye molecules, which can form carbocations of sufficient stability to be formed reversibly in water, with the polymer in an aqueous solution to attach the dye molecules to the amide groups.

In another one of its aspects, the invention provides a modified water-soluble polymer having amide groups with dye groups attached thereto by carbocation forming groups.

With the present invention, dye molecules can be chemically attached to the amide groups in polymers to provide stable, labelled polymers. The labelled polymers can then be detected spectrophotometrically.

This method of detecting polymers containing amide groups is fast and simple and is significantly more sensitive than conventional chemical detection methods.

Moreover, the presence of the dye in the polymer may affect the hydrophilic-lipophilic balance of the polymer which may be advantageous in certain applications, such as enhanced oil recovery. Currently, derivatives of polyacrylamide are prepared by copolymerization to change this balance.

Most of the water-soluble polymers containing amide groups that are the subject of the present invention, are soluble only in water. The amide groups in these polymers are normally very unreactive. Hence attaching groups to the pre-formed polymer is very difficult. On the other hand, trying to introduce these groups during the preparation of the polymer is complicated by side reactions which limit the molecular weight of the polymer.

It is has been discovered that certain organic dye molecules form carbocations of such stability that they can be formed reversibly from their corresponding alcohol in water solution. These molecules form carbocation intermediates when added to water or water-acetic acid solution and these intermediates attach themselves chemically to amide groups of polyacrylamide molecules in solution. The resultant amide groups with dye molecules attached thereto preferably absorb light strongly in the UV and/or visible range and most preferably fluoresce strongly. The labelled polymers can then be detected as traces by UV visible absorption measurement or by fluorescence measurement.

The dye molecule must be able to form a carbocation of sufficient stability that it is formed reversibly in water from its corresponding alcohol or ether. Most carbocations are not sufficiently stable, so the dyes will not attach themselves to the polymer under conditions where the polymer does not undergo side reactions. Since the amide groups are very stable, dyes which form insufficiently stable carbocations will not be attached thereto. On the other hand, some dyes such as malachite green have carbocations so stable that they will not react with the polyacrylamide, or will not stay attached thereto.

Preferably, the carbocation stability value, or $pK_{R+}$ value is in the range of $-6$ to $+7$, and most preferably is in the range of $-4$ to $+4$.

Substantially any dye containing a dye group and a stable carbocation forming group is suitable for use in the present invention. The dye group can be either aromatic or organo-metallic. Preferably, the dye group is fluorescent as such dyes can be detected with greater sensitivity than absorptive dyes. The dye groups are preferably chosen from polynuclear aromatic hydrocarbons and derivatives, azo dyes and derivatives, coumarins and derivatives, chromones and derivatives, polyenes and derivatives; benzoxazines and derivatives, cyanines and derivatives, xanthenes and derivatives, acridines and derivatives, fluoroescein and rhodamine dyes and indigold dyes.

The carbocation forming groups are preferably alcohols, ethers, chlorides, bromides, iodides, tosylates or other esters of chlorides, bromides, iodides or tosylates and xanthyl and derivatives thereof, tropylium and derivatives thereof, benzo-, dibenzo- and other fused-ring derivatives of tropylium and derivatives thereof, cyclopropenyl and derivatives thereof, trialkylmethyl and derivatives thereof, diarylalkylmethyl and derivatives thereof, and triarylmethyl and derivatives thereof. Only those members of the above carbocation forming groups whose $pK_{r+}$ values fall within the desired range are suitable for use in the present invention. For example, substantially only the aryldialkylmethyl groups and diarylalkylmethyl groups and derivatives thereof containing alkoxy- or N,N-dialkylamino substituents in the ortho or para positions of the aromatic rings have suitable $pK_{r+}$ values. Most other members of this group are too unstable to be suitable for use in the present invention.

The most preferred dye molecules for use in the present invention are xanthydrol, dibenzosuberenol, 9-anthryl-di-(4-methoxyphenyl)methanol, other polynuclear aromatic hydrocarbons, and typical scintillator dyes such as terphenyl and POPOP (1,4-bis(2-(5-phenyloxazolyl))benzene).

It is necessary to control the amount of dye molecules attached to the polymer, since if too many such groups are attached, the polymer will be rendered insoluble in water and, in most cases, will no longer be useful. Also, as mentioned above, the amount of dye molecules attached to the polymer may also affect the hydrophilic-lipophilic balance of the polymer. The amount of dye molecule to be added to the polymer will thus depend on the particular application of the polymer and can be determined by one skilled in the art, but in most cases, the amount of dye molecule to be added is preferably about $\frac{1}{2}$ to 1 mole per 100 moles of monomer.

Substantially any water-soluble polymer containing an amide group can be modified by the process of the present invention. The polymers are preferably selected from polyamides, polyacrylamides, polymethacrylamide polymers and polyacrylamide derivatives. Suitable polyacrylamide copolymers include partially hydrolyzed polyacrylamide, polyacrylamide modified by Hoffmann Degradation, polyacrylamide modified by the Mannich Reaction, copolymers with acrylic acid and its salts or derivatives, copolymers with "vinylamine" and its salts, copolymers with N-alkyl or N-aryl acrylamide, copolymers with N,N-dialkyl, N,N-diaryl, and N-aryl-N-alkyl acrylamides and polymethacrylamide and copolymers defined above.

The polyacrylamide derivatives preferably contain groups selected from anionic groups, such as sulphate, sulphonate and carboxylate; cationic groups such as ammonium and alkyl ammonium; and hydrophobic groups.

A preferred embodiment of the invention will be further described, by way of illustration only, with reference to FIG. 1, which depicts a mechanism for forming a labelled polymer from polyacrylamide and 9-xanthydrol.

As can be seen in FIG. 1, polyacrylamide indicated by numeral I is reacted with 9-xanthydrol, indicated by numeral II to produce labelled polyacrylamide III. The mechanism is shown below the overall reaction, and includes the steps of first protonating the 9-xanthydrol II to give the intermediate IV, which is dehydrated to form the intermediate V. This intermediate reacts at the amide nitrogen of I to give the intermediate VI. Deprotonation of the intermediate VI results in the labelled polymer III.

The dye-substituted polymers are generally prepared by solvolysis reactions. For example, solutions of a polymer containing amide groups can be reacted with a series of dye derivatives which undergo solvolysis in water or water cosolvent mixtures to yield a carbocation of appropriate stability. These reactions are carried out in water, acetic acid, formic acid, or in water-acetic acid or water-formic acid mixtures. Preferred solvents contain from 5% to 90% acetic or formic acids. The reaction temperature is from 0° C. to 40° C., preferably 10° C. to 30° C. The reaction requires an acid catalyst. This is achieved by adding mineral acids such as sulfuric acid, hydrochloric acid, and the like to the solution, or by carrying out the reaction in the presence of formic acid, acetic acid, or other water-miscible organic acids.

The polymer concentration in the reaction mixture can range from 0.1% to 20%, but preferably ranges form 0.5% to 2% by weight. The dye need not be noticeably soluble in the reaction mixture if present as a fine suspension. The amount of dye added is typically from 1% to 25% by weight of that of the polymer. The reaction can be followed by gel permeation chromatography (gpc) using either a uv-visible detector or a fluorescence detector and is terminated when the desired degree of substitution is achieved. Typical substitution achieved in these reactions ranges from 0.01% to 15% with the preferred reaction giving from 0.2% to 5% substitution and more preferably from 0.5% to 2% substitution.

The reaction is terminated by filtering the solution and pouring it into an excess of ethanol, methanol, isopropyl alcohol, acetone, tetrahydrofuran, dioxan and acetonitrile or other precipitant for the polymer. The volume of precipitant is typically 5 to 30 times the volume of the reaction mixture, preferably 5 to 10 times this volume. The labelled polymer is collected by filtration, washed with the solvent used as the precipitant and dried. If necessary, labelled polymer can be purified by redissolving in water or water-acetic acid mixtures, followed by reprecipitation.

Preferred embodiments of the invention will be further described, by way of illustration only, with reference to the following examples.

EXAMPLE 1

1 g of polyacrylamide (MW 295000) was dissolved in a mixture of water (25 ml) and glacial acetic acid (100 ml). To the stirred solution was added a solution of 200 mg 9-xanthydrol in 10 ml of glacial acetic acid. The mixture was stirred at room temperature in the dark for 48 hours, at which time analysis by gel permeation chromatography revealed that the polymer was labelled. The reaction mixture was poured into 1 l of methanol and the precipitated polymer was filtered. It was further purified by redissolution in water, followed by one more precipitation from methanol. Drying in vacuo afforded 0.75 g of labelled polymer.

Ultraviolet measurements on the product revealed a label content of 1.2 mole % (50 labels per chain).

EXAMPLE 2

1 g of polyacrylamide (MW 5-6000000) was dissolved in a mixture of 200 ml glacial acetic acid and 40 ml water. A solution of 9-xanthydrol (24 mg) in 5 ml acetic acid was added and the mixture stirred for 72 hours. Precipitation in 1 l of methanol (twice) afforded 0.68 g of polymer, label content 0.29 mole % (240 labels/chain).

EXAMPLE 3

A solution of 100 mg dibenzosuberenol in 10 ml glacial acetic acid was made and added to a solution of polyacrylamide (MW 5-6000000, 1 g) in 200 ml water. This resulted in the formation of a suspension of dibenzosuberenol. To the mixture was added 40 ml of 50% sulfuric acid, and the suspension was stirred at room temperature for 24 hours. The suspension was filtered, and the polymer precipitated by pouring into 1 l of methanol. The labelled polyacrylamide was collected, redissolved in water, filtered, and reprecipitated with methanol. Drying yielded 0.69 g of polymer, label content 0.59 mole % (455 labels/chain).

EXAMPLE 4

The process described in Example 3 was repeated with the temperature maintained at 30° C. Reaction under these conditions for 18 hours, followed by the above workup and isolation afforded 0.58 g of polymer of similar label content.

EXAMPLE 5

1 g of polyacrylamide (MW 100000, 5% carboxylic acid content) was dissolved in a mixture of 200 ml acetic acid and 40 ml water. To the stirred solution was added a solution of 200 mg dibenzosuberenol in 25 ml acetic acid, and 40 ml of 50% sulfuric acid. After 10 hours at room temperature, the polymer was isolated and purified by filtration and precipitation from methanol. Label content was determined to be 0.9% (13 labels per chain).

We claim:

1. A process of preparing modified, water-soluble polymers containing pendant amide groups, said process comprising reacting organic dye molecules which can form carbocations reversibly in water, with said polymers in an aqueous solution to attach said dye molecules to said amide groups; wherein the $pK_{R+}$ value of the dye molecules is from $-6$ to $+7$.

2. The process of claim 1 wherein the $pK_{R+}$ value of said molecules is from $-4$ to $+4$.

3. The process of claim 1 wherein said dye molecules comprise dye groups and carbocation-forming groups; said carbocation-forming groups being selected from the group comprising alcohols, ethers, chlorides, bromides, iodides, tosylates and esters.

4. The process of claim 3 wherein said carbocation-forming groups are selected from xanthyl, tropylium, benzo- and dibenzotropylium, triarylmethyl, alkyldiarylcyclopropenyl, aryldialkylcyclopropenyl, trialkylcyclopropenyl, diarylcyclopropenyl, alkylarylcyclopropenyl and dialkylcyclopropenyl.

5. The process of claim 3 wherein said dye groups are fluorescent.

6. The process of claim 3 wherein said dye groups are selected from polynuclear aromatic hydrocarbons and derivatives thereof, azo dyes and derivatives thereof, coumarins and derivatives thereof chromones and derivatives thereof, polyenes and derivatives thereof, benzoxazines and derivatives thereof, cyanines and derivatives thereof, xanthenes and derivatives thereof, acridines and derivatives thereof, fluorescein and rhodamine dyes and indigoid dyes.

7. The process of claim 1 wherein said dye molecules are selected from 9-xanthydrol, xanthydrol, dibenzosuberenol, 9-anthryl-di-(4-methoxyphenyl)methanol, other polynuclear aromatic hydrocarbons, and scintillator dyes.

8. The process of claim 1 wherein from 1 to 15 parts by weight of dye molecule per 100 parts by weight of said polymer are reacted with said polymer.

9. The process of claim 1 wherein said polymer is selected from polyamides, polyacrylamides, polyacrylamide copolymers, and polyacrylamide derivatives.

10. The process of claim 9 wherein said polyacrylamide copolymers include partially hydrolyzed polyacrylamide, polyacrylamide modified by Hoffmann Degradation, polyacrylamide modified by the Mannich Reaction, copolymers with acrylic acid and its salts or derivatives, copolymers with N-alkyl or N-aryl acrylamide, copolymers with N,N-dialkyl, N,N-diaryl, and N-aryl-N-alkyl acrylamides.

11. The process of claim 9 wherein said derivatives contain groups selected from anionic groups, cationic groups and hydrophobic groups.

12. The process of claim 11 wherein said anionic groups include sulphate, sulphonate and carboxylate.

13. The process of claim 11 wherein said cationic groups include ammonium and alkyl ammonium.

14. The process of claim 1 further including the step of detecting said polymers by UV absorption measurement.

15. The process of claim 5 further including the step of detecting said polymers by fluorescence measurements.

16. The process of claim 1 wherein the reaction is carried out in a solvent selected from water, acetic acid, formic acid, water-acetic acid mixtures, and water-formic acid mixtures.

17. The process of claim 16 wherein said solvent is selected from 5-90% acetic acid in water and 5-90% formic acid in water.

18. The process of claim 1 wherein the reaction is carried out at 0°-40° C.

19. The process of claim 18 wherein the reaction is carried out at 10°-30° C.

20. The process of claim 1 wherein the reaction is carried out in the presence of an acid catalyst selected from mineral acids and water miscible organic acids.

21. The process of claim 20 wherein the reaction is carried out in the presence of an acid catalyst selected from sulfuric acid, hydrochloric acid, formic acid, acetic acid and water miscible organic acids.

22. The process of claim 1 wherein from 0.1 to 20% by weight polymer is present in said solution.

23. The process of claim 23 wherein 0.5 to 2% by weight polymer is present in said solution.

24. The process of claim 1 wherein following reaction of said polymer and said dye molecule, a polymer precipitant is added to precipitate the polymer from solution.

25. The process of claim 24 wherein said precipitant is selected from ethanol, methanol, isopropyl alcohol, acetone, tetrahydrofuran, dioxan and acetonitrile.

26. The process of claim 24 wherein 5 to 30 times the volume of solution of precipitant is added.

27. The process of claim 26 wherein 5 to 10 times the volume of solution of precipitant is added.

28. The process of claim 7 wherein said scintillator dyes comprise terphenyl and 1,4-bis(2-(5-phenyloxazolyl))benzene.

29. The process of claim 9 wherein said polyacrylamide copolymers include polymethacrylamide, copolymers of methacrylamide with acrylic acid and its salts or derivatives, copolymers of methacrylamide with N-alkyl or N-aryl acrylamide and copolymers of methacrylamide with N,N-dialkyl, N,N-diaryl, and N-aryl-N-alkyl acrylamides.

* * * * *